United States Patent Office 3,201,921
Patented Aug. 24, 1965

3,201,921
PROCESS AND APPARATUS FOR TREATMENT OF FLUIDS WITH ADSORPTIVE MATERIALS
Josef Heyes, Dusseldorf-Oberkassel, Germany, assignor to Dr. W. Kampschulte & Cie., Solingen, Germany, a German corporation
Filed Jan. 4, 1960, Ser. No. 296
Claims priority, application Germany, Jan. 5, 1959, H 35,284
17 Claims. (Cl. 55—56)

The present invention relates to the treatment of fluids with adsorptive materials to remove substituents contained therein, and more particularly to a process and apparatus for carrying out such treatment wherein selective recovery of the removed substituents may be effected. Many attempts have been made heretofore to separate inorganic or organic substituents from one another in a partially or completely continuous manner using adsorptively active substances such as activated charcoal and ion exchange materials. While these attempts have brought about a certain degree of success, in all of them the adsorbent or ion exchange material is disadvantageously required to be pulverized since the individual particles must be able to move freely against one another to afford efficient surface contact in operation. Also, in accordance with prior techniques, the control procedures were complicated, and therefore necessitated a high degree of mechanical effort in order to obtain the desired movement of the active adsorbent or ion exchange material.

In view of the desired movement of the solid particles against one another for greater operational efficiency, however, a considerable advantage is lost where the process is to be carried out with a stationary column bed of the adsorbent or ion exchange material. Normally, for this purpose, a glass tube is used containing a column bed of the adsorbent or ion exchange material. During the passage therethrough of gases or liquids containing the substituents to be removed by the adsorbent material, zones are created in the column above which the concentration of the particular substituent to be separated is comparatively high, but below which such concentration is practically equal to zero. Accordingly, for greater efficiency and maximum utilization, the charging of such columns of adsorbent or ion exchange materials may be increased so as to closely approach the maximum concentration at which the substituent to be adsorbed thereon passes through the column bed.

Due to the difference in nature and adsorptive activity of the various substituents in the particular fluid medium which are to be retained by the column bed, these various substituents are more or less classified advantageously along the extent of the column bed in separate zones. This is even more pronounced especially where after a particular run the column is treated with a subsequent amount of fluid containing the substituents to be retained (preferably only up to the break-through point, i.e. to the exhaustion of the adsorbent activity of the column bed) or with a washing agent, solvent or gas, and the like. In this way, the retained substituents are classified along the column in separate zones of strong concentration. The portions of the bed corresponding to the different zones and which are frequently differently colored may be separately recovered from the container for the column and thereafter washed and treated with suitable solvents and other agents in accordance with conventional procedures.

It is, therefore, an object of the invention to overcome the foregoing disadvantages and to provide a process and apparatus for carrying out the treatment of fluids with adsorptive material to remove substituents contained therein in more efficiently and effectively wherein selective recovery of the adsorbed substituents so removed may be effected.

Other and further objects of the invention will become apparent from a study of the within specification and accompanying drawings, in which, FIG. 1 is a schematic side view of an embodiment in accordance with the invention partially broken away to illustrate details of construction;

Figure 1:
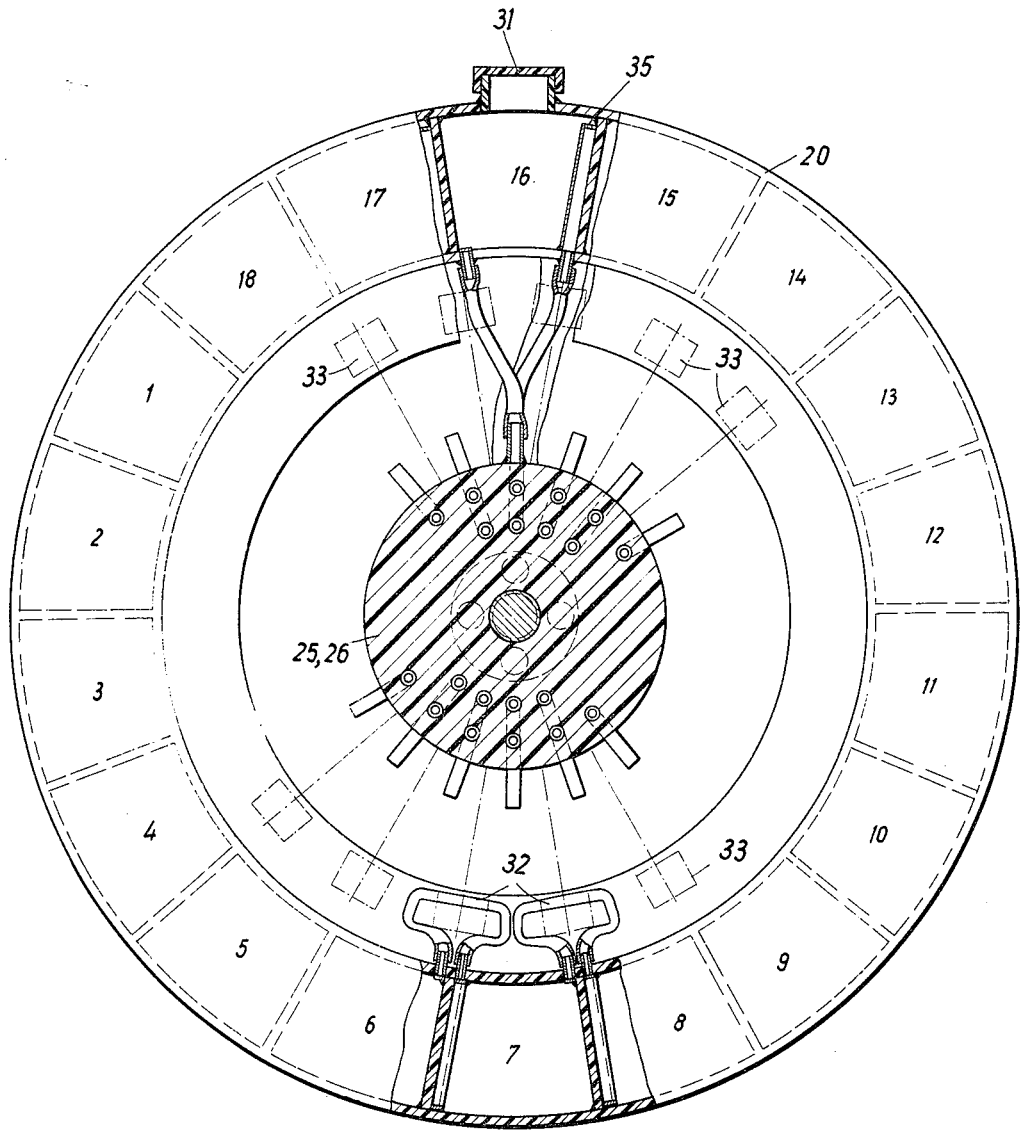
FIG. 1a is an enlarged partial sectional view of one cell of FIG. 1 showing screening means.
FIG. 1b is an enlarged partial sectional view of a modified cell embodiment showing remote control valve means and screening means.

It has been found in accordance with the invention that fluids may be treated very effectively with adsorptive materials capable of removing and retaining substituents present in the fluids by passing the fluid through a series of at least two individual flow-connected separate zones containing such adsorptive material. Hence, contact is effected between the fluid and adsorptive material and this causes the selective adsorption of the substituents in the fluid along the extent of the series of zones. In this way, various substituents may be removed from the fluid at different points along said series of zones. The adsorptive material in each zone is thereafter preferably separately treated with an agent to remove the particular substituents retained thereby. The substituents may then be separately recovered and the cycle repeated.

The adsorptive material may be any surface active substance capable of adsorbing substituents from a liquid or a gas. Among the materials which may be used are activated charcoal and ion exchange materials such as conventional cation and anion exchange resin materials.

In accordance with the preferred method, after the treated fluid has been removed from the particular zone, the adsorptive material therein is preferably subjected to contact with a washing agent to remove residual traces of fluid therefrom. The adsorptive material may then be subjected to suction to remove the washing agent and be treated with a drying agent such as hot air prior to separate recovery of the retained substituents.

The process may be carried out for separating substituents from fluids by contact with adsorptive materials in a continuous or semi-continuous manner. In this regard, a system of zones or cells circularly arranged one adjacent the next is used wherein each cell may be closably flow connected with the next in line. This flow connection may be controlled by valve means and the like.

An embodiment of an apparatus which may be used for carrying out the invention includes a rotatable disc having a plurality of cells adjacently arranged along the periphery thereof. Each cell is provided with an inlet conduit for the passage to and through the cell of a fluid to be treated by the adsorptive material therein and an outlet conduit for discharge of the fluid. All of the cells are provided in closable flow communication with one another. The rotatable disc or flange has a central control head portion which is a collector means for said conduits and is constructed to permit the passage of a fluid from a source to at least a portion of the inlet conduits and from at least a portion of the outlet conduits of cells during at least a part of each cycle of rotation of the disc.

Thus, a series of adjacently arranged cells may be in flow communication with one another so that fluid passes successively through the cells in the series via the flow communication. Upon completion of the treatment, the cells are revolved, adding one or more new cells to one end of the series in flow communication and subtracting a corresponding amount from the other end no longer in flow communcation. The cells are preferably revolved in opposite direction to the flow direction of fluid through the series of cells.

The closure of flow communication between adjacent cells may be accomplished by a valve means such as a remote control valve means for instance actuatable upon the operation reaching a set of predetermined conditions. Additionally, a resilient channel may be used to flow connect adjacent cells, which upon rotation about a specific predetermined portion of a cycle is pressed tightly closed by a compression roller passing therealong.

In consequence of the invention, a fluid may be passed successively through a series of adjacent cells on the rotatable disc to cause selective adsorption of constituents contained in the fluid along the extent of series of cells. Thereafter each cell in turn may be suitably closed off from flow communication with the remainder of the series of cells, the adsorbent material therein separately subjected to suction to remove last traces of fluid, which may be added to the fluids entering the next cell which is first in the new ordinal succession of cells, as well as separately washed, purified, and even dried. A second succession of cells in flow communication is also provided in contrast to the first, the adsorbed substituents being removed and separately recovered therefrom in the same way by passage therethrough of a suitable agent for this purpose followed by suitable washing, purifying and drying steps if desired.

After fluid contact with the adsorptive material in the succession of cells in series, the same fluid, now free of adsorptive substituents, may be again passed through the series for rinsing the adsorptive material. Alternatively, the rinsing may be carried out with any other suitable agent.

In accordance with the invention, therefore, substituents contained in the fluid may be efficiently selectively removed therefrom by surface active materials such as adsorptive materials in separate individual zones in a series. Since the adsorptive material may have different capacities for various substituents, a classification or ordinal separation among the differently intensive substituents along the succession of cells in the series is able to occur. Each classification area may suitably fall in one or more separate cells which may be treated for removal of the retained substituents separate and apart from the remainder. In this way, a selective range of adsorbed substituents may be recovered.

If the fluid is a gas mixture containing substituents to be removed, the adsorptive material is suitably impregnated with a liquid possessing selective solvent capacity, for example, for the components contained in the gas mixture which are to be removed. After passing the gas therethrough and rinsing the adsorptive material in the cell, for instance, by repassing the gas therethrough once more, the adsorptive material is contacted with a solvent which dissolves out the impregnating liquid in order to remove the same from the reaction system to permit obtaining the adsorbed substituents selectively from the various zones.

Upon repeating the impregnating cycle to afford selective solvent capacity for the adsorptive material, the process is repeated.

Figure 2:
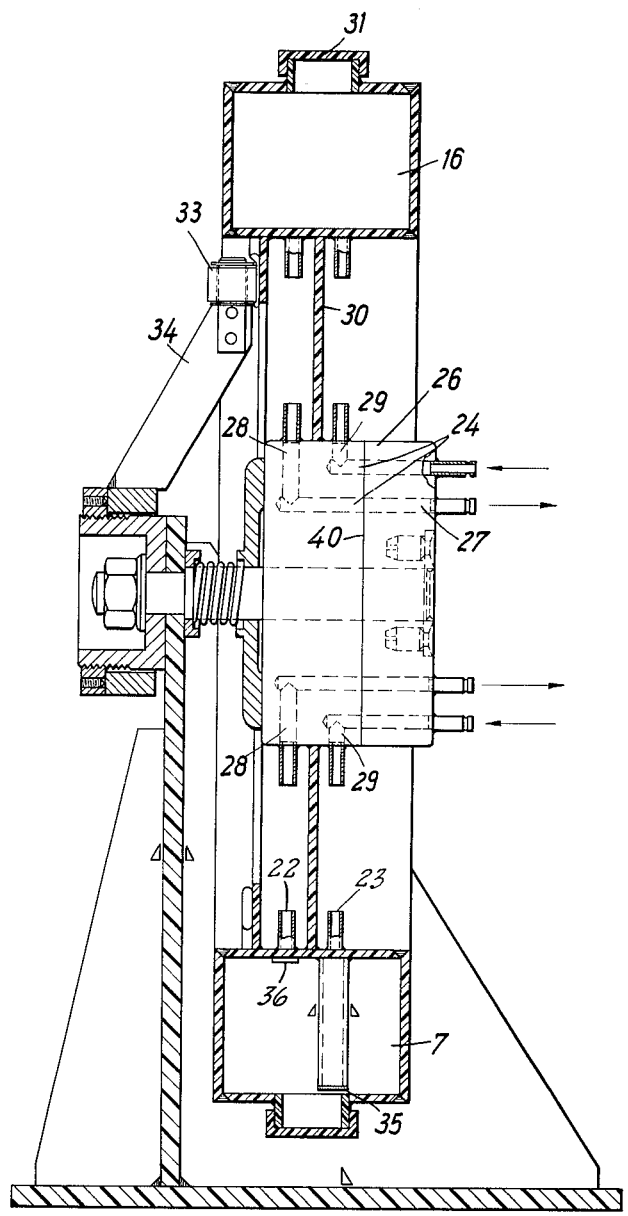
FIG. 2 is a schematic axial sectional view of the embodiment of FIG. 1 including additional mounting details of construction.

Referring to the drawings, FIGS. 1 and 2 show a rotatable member 20 having a disc flange 30, a central control head 25, and a plurality of peripheral cells 1 to 18 having radial partitions therebetween. Each of cells 1 to 18 is provided with an inlet and outlet conduit 22 and 23 which pass into control head 25 and communicate with bore holes 24 therein via bore holes 28 and 29. Inlet 22 terminates more or less at the radially innermost wall of the particular cell while outlet 23 extends into the cell more or less to the radially outermost wall of the cell. This ensures that maximum flow-through efficiency is present at all times.

The charging of the fluids to the cells and the discharging therefrom as well as the rinsing step all take place via preferably rigidly mounted corresponding control part 26. At the radial distance of the bore holes 24, bore holes 27 in control head 26 are in turn provided, which thus connect conduits 22 and 23 via bore holes 28 and 29 and bore holes 24 with the source and return for the treatment fluids. Upon rotating control head 25, disc 30 and cells 1 to 18, the respective bore holes 24 therein and bore holes 27 in stationary control head 26 are placed in flow communication one after the other. The remaining parts of control head 25 and control head 26 are sealed off against flow communication along the common contact surface 40.

Rotatable member 20 is suitably mounted on a shaft for rotation and the same may be accomplished manually, by a motor or engine, or the like. The drive source of the shaft is not shown. The control of the rotation of the rotatable member 20 may be effected relative to various physical or chemical characteristics of the inlet feed or discharge fluids. These fluids may suitably serve to activate means responsive to changes in characteristics, temperature, and the like thereof and in turn operate remote control equipment to, for instance, initiate and stop rotation of the member 20. Heat conductivity of such fluids and especially light absorption, particularly in the ultra-red range of gases, may be used as well as electrical conductivity or potential of certain electrodes immersed in liquids for the above purposes. Such procedures are well-known expedients in this regard.

The cells 1–18 may be filled with an ion exchange material or other adsorptive material such as charcoal via filling nozzle 31. Although each cell is provided with a filling nozzle 31, for convenience only one has been shown, on cell 16. The same may be said with respect to inlet and outlet conduits 22 and 23 which are illustrated only on cell 16 but are actually present on every cell, and each cell is provided with a flow connection 32 to its adjacent cells, and for each flow connection, there is a roller element 33 or the like, although this arrangement has not been illustrated in the drawings but for cell 7.

Figure 1A:
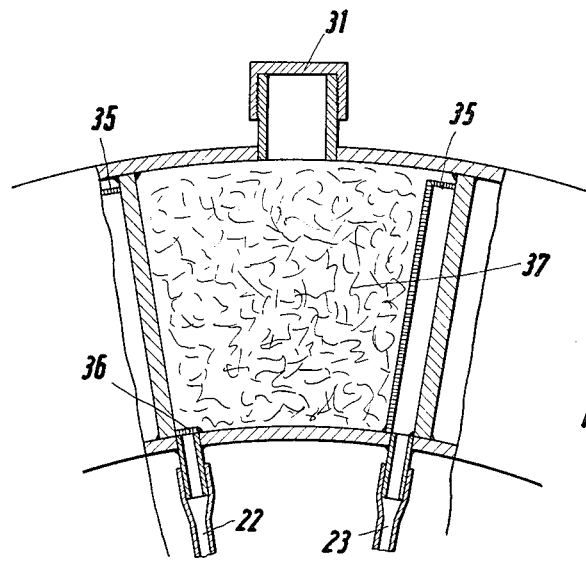

The flow connection between adjacent cells is shown by channels of flexible resilient tubing such as rubber hoses 32 radially inwardly of cell 7. Schematically, adjacent cells 18–13 and 4–9 are disposed roller elements 33 capable of pressing hoses 32 closed at the appropriate point in the cycle. Roller elements 33 are resiliently mounted via brackets 34. It is preferred that conduits 22 and 23 as well as hoses 32 be provided with screening sieves 35 and 36 to prevent loss of the adsorptive solid material 37 such as an ion exchange material from the cells as may be seen more clearly in FIG. 1a.

Figure 1B:
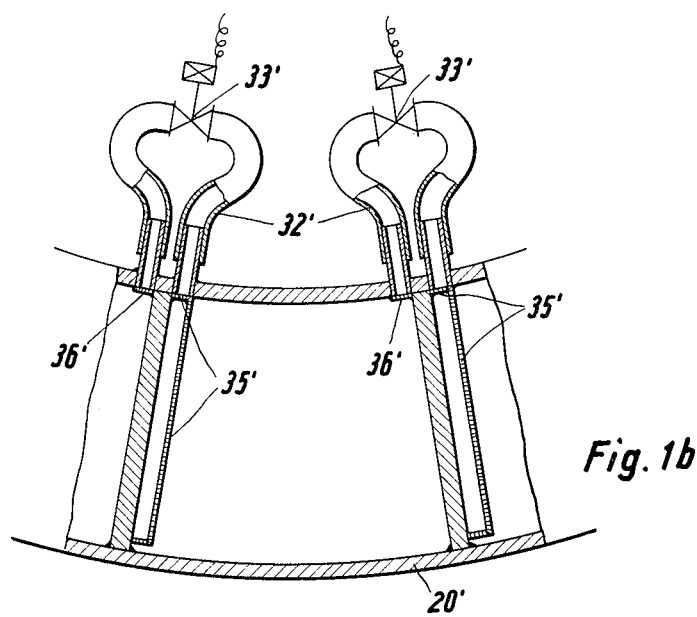

In accordance with the modified embodiment of FIG. 1b, in place of hoses 32 and roller elements 33, the hoses 32' of the cells of the rotatable member 20' may be provided in flow communication, the same being closable by a valve 33'. The valve may even be placed in the common radial partition between adjacent cells. Of course, as above mentioned, the valve may be actauted by remote control, e.g. by compressed air or magnetic influence. Furthermore, the control head 25 or 26 may be provided with the means for effecting remote control actuation of the rotating member 20'. Screening means 35' and 36' may also be provided to prevent the outflow of adsorptive material from the respective cells in the same manner as in FIG. 1a.

Since each of the cells possesses two separate feed lines 22 and 23, after interruption of flow communication to the adjacent chambers, each cell may be washed and dried independently of the others. This is important where it is desired to obtain separately individual substituents or groups of substituents having differently intensive adsorptive characteristics with respect to the adsorbent or ion exchange. In this case, the column consisting of the series of individual cells, after passage of the fluid therethrough, is washed with the same or a different solvent, wherein the substituents to be separated settle in ordinal layers separate from one another. By proper control, of the washing process, the individual layers may be allocatable to separate chambers. Then it is possible to obtain separately in the manner indicated above, the substituents contained in the individual layers.

Figure 3:
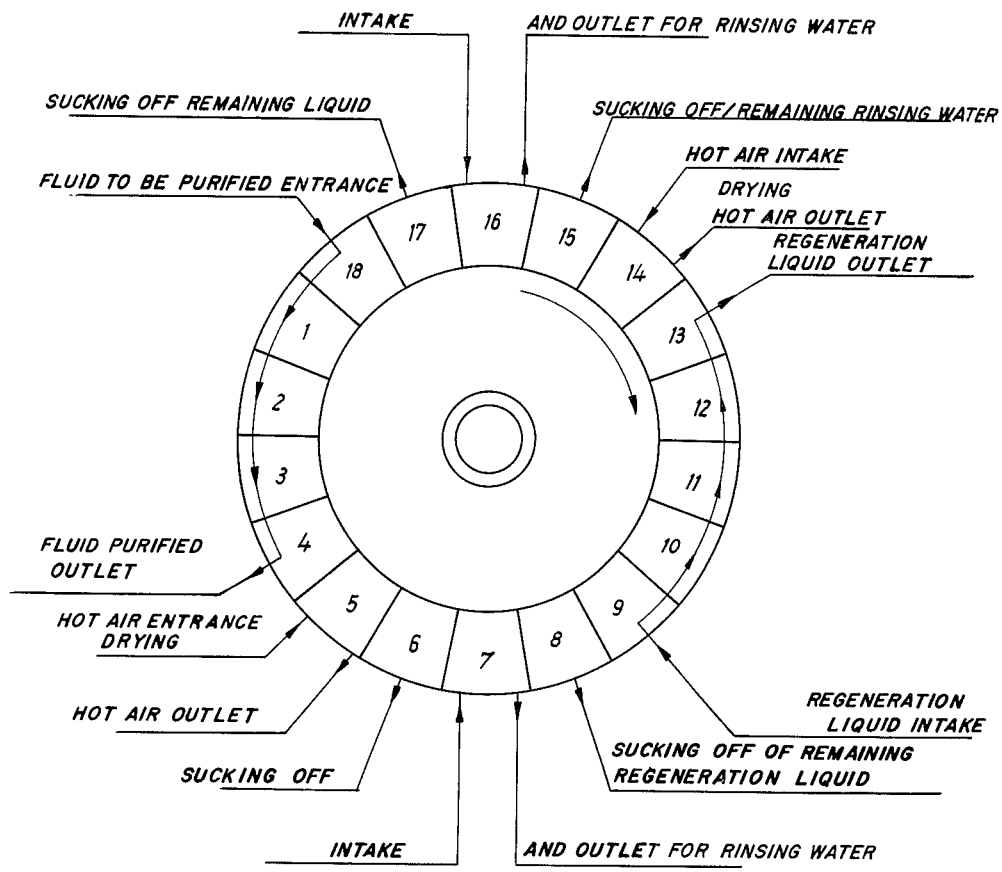
FIG. 3 is a schematic flow diagram illustrating the manner in which the invention may be executed.

The obtaining of a metal salt from the waste liquors of a galvanic installataion with a cation exchange resin is explained with respect to FIG. 3.

The liquid to be purified from the metal cation enters at 18 into the series cell system, flows slowly through the cells 1, 2, 3 and 4 and therein gives up to the cation exchange resin material present in the cells, the metal-ion to be adsorbed. The liquid passing out at 4 runs off practically free from metal-ions. After a prolonged stay in the liquid loading section, defined by the series of cells 18, 1, 2, 3, and 4, cell 17 is now separated from cell 18 and from the next cell 16. The liquid still remaining in cell 17 is as extensively as possible pressed out by compressed air and preferably again added to the liquids flow to cell 18.

In cell 16, a purification of the ion exchange material, takes place by means of a rinsing water which removes the still adhering residues of the liquid from which the metal has been removed. The rinsing water still adhering to the adsorbent is pressed out by compressed air in cell 15 and completely removed by drying in cell 14. The two last named process steps are important where the metal-ion is to be accumulated in as high a concentration as possible. They may be optionally omitted if this result is not desired.

In cell 13, the exchange material, whose hydrogen ions have been for the most part replaced by metal ions, is acted upon by the regeneration liquid used. In this case, a more or less concentrated acid solution is used for regeneration. The metal ions are again exchanged for the acid hydrogen ions, and consequently there runs off a highly concentrated, almost neutral solution of the metal salt of the acid used. The removal of the metal ions from the exchange material proceeds more strongly, as the cells approach the entrance of the acid into the series cell system.

In FIG. 3, it is indicated that the regeneration liquid may pass unimpededly through cells 9–13. The regeneration liquid cannot enter cell 8, however, wherein the removal of the still present acid is carried out. Also, the cell 8 is separated from cell 7, in which the purification of the exchange material from the still present acid residue takes place. Finally, in cell 6, the still remaining water may again be removed and in cell 5, the exchange material may be dried, if required or desired.

A further example of execution deals with the fractional adsorption of gases and vapours (FIG. 3) using charcoal or similar adsorbents. In this regard, conventional arrangements have been used which include a ring of cells provided for the reception of charcoal. Nevertheless, these arrangements did not provide for an efficient flowing through of the substance to be treated through the coal in a peripheral direction, but instead in a radial direction. In consequence of this, the path along which the gas travels through the coal is considerably shorter and hence the time of contact in the charcoal is smaller. Furthermore, such conventional arrangements do not provide a fractionation of the constituents forming the gas mixture. While the first described process embodiment may be carried out practically at constant temperature, in the obtaining of vapours from gases, the adsorbent must be alternately cooled and/or heated as the case may be.

The mode of operation is shown in terms of the recovery of solvent vapours from air containing the same. This air enters control head 25 coming from control head 26 and via the transverse bore hole 29, as well as the hose channel 23, such air enters cell 18 filled with the adsorbent material. The air passes one after the other in succession through cells 1, 2, 3 and 4 via the open flow conduit 32. The solvent vapours contained in the air are retained by the adsorbent, while the air itself leaves the control head 25 via the bore holes 28, 24, and 27. The connecting lines from cell 18 to cell 17 and from cell 4 to cell 5 remain closed. If cell 18 passes by rotation to the position of cell 17, then it is acted upon by the stream of hot vapour which, coming from cell 12, has already passed through the cells 13, 14, 15, and 16. Together with the solvent vapours, the vapour then leaves the device via conduit 22 as well as bore holes 28, 24, and 27, in order to be condensed in a cooler, not shown, together with the solvent vapour, and thus separated from the same.

Upon the passage from the position of cell 12 to that of cell 11, the adsorbent arrives within the range of drying. The conduits to cell 12 are then closed off. The drying in the sectors of the cells 11 and 10 may take place selectively through hot air or also indirectly through heating with electric current or steam. In this case, there must be arranged in the chambers suitable heat resistances or steam coils. Before recharging with solvent vapours the adsorbent must be cooled. This may take place by contact with air or even by use of the above-mentioned pipe coils, which in this case contain a circulating cooling agent.

Of course, also in this phase the cells 9, 8, 7, 6, and 5 in which this process takes place, must be series connected with one another, but separated from the adjacent cells 10 and/or 4. After passing the position of the cell 5, the cells are ready for the reception of new solvent vapours and the cycle may be repeated.

A few results obtained with the process may be published:

The concentration of a copper salt solution was 0.85 g./l. copper. This solution was passed through the apparatus containing a number of cells with a total content of 450 cc. from the top to the bottom. The cells were filled with the ion exchange material "LEWATIT S100" of Bayer, Leverkusen, Germany. This ion exchange material was pretreated with a dilute acid, 1:1 HCl, to convert the same to the hydrogen-ionic state.

The rate of flow of the solution was 1.4 m./h., 24 liters were passed through the cells. The color of the ion exchange material changed from brown to green by the absorbing of copper. When half of the last zone had changed its color, the rest of the solution was pumped off, the ion exchange material was washed with demineralized water and brought into the flow of the regenerating solution, the direction of which was opposite to the flow of the first mentioned solution, i.e. copper salt solution. The concentration of the regenerating solution was 420 g./l. HClO$_4$. From time to time 20 cc. of the flowing off solution were collected and the copper and acid concentration thereof analyzed. 18 samples, amounting to 360 cc. of the copper containing solution, were collected. The copper concentration of this mixture was 29.1 g./l. copper, and the acid concentration was 17.6 g./l.

The adding of the acid solution was terminated after the copper concentration decreased. The acid solution was introduced again after a new or fresh copper saturated cell was added to the regenerating system of the apparatus. While the copper concentration increased from 0.85 g./l. copper to 29.1 g./l. copper, the acid concentration of the regenerating solution decreased from 420 to 17.6 g./l.

What is claimed is:
1. Apparatus for the treatment of fluids with adsorptive materials, which comprises means defining a rotatable member having a plurality of completely closed cells arranged along the periphery thereof, said cells each having an inlet conduit for the passage to and through the cell of a fluid adapted to be contacted with an absorptive material within the cell and an outlet conduit for discharge of the fluid from the cell, said cells each being in closable flow communication completely within said rotatable member with the next adjacent cell, and means for passing a fluid from a source to at least a portion of the inlet conduits and from at least a portion of the outlet conduits of said cells during at least a part of each cycle of rotation of said rotatable member.

2. Apparatus according to claim 1, wherein said cells are adjacent one another along the entire peripheral circumference of said rotatable member.

3. Apparatus according to claim 2, wherein said cells are each separated from one another by a common wall.

4. Apparatus according to claim 1, wherein each cell is provided with means for filling the same with an adsorptive material.

5. Apparatus according to claim 1, wherein the inlet conduit of each cell communicates therewith at the radially inward portion of the cell and the outlet conduit communicates therewith at the radially outward portion of the cell.

6. Apparatus according to claim 1, wherein the flow communication between adjacent cells is provided by a closeable inter-connecting conduit.

7. Apparatus according to claim 6, wherein said conduit is made of resilient tubing.

8. Apparatus according to claim 7, wherein compressing means are provided for pressing said tubing closed to shut off flow communication between said cells.

9. Apparatus according to claim 8, wherein said compressing means include a plurality of roller means mounted for pressing engagement with said tubing to shut off said flow communication during at least a part of each cycle of said rotatable member.

10. Apparatus according to claim 6, wherein a valve means is provided in said conduit to shut off said flow communication.

11. Apparatus according to claim 10, wherein said valve means is actuated by remote control.

12. Apparatus according to claim 1, wherein said inlet conduits and outlet conduits are provided with screening means for preventing outflow of adsorptive material from the cells.

13. Apparatus according to claim 1, wherein said rotatable member is provided with a central portion, said inlet and outlet conduits extending radially inwardly from said cells to and into said central portion, and stationary means defining distributor channels and discharge channels in rotational abutment with said central portion, said channels being in flow communication with at least a portion of said inlet and outlet conduits during at least a part of each cycle of rotation of said rotatable member.

14. Apparatus according to claim 13, wherein said central portion is provided with an axial end surface, said inlet and outlet conduits extending radially into said central portion further extending in said central portion disposed in axial direction and terminating at said surface, said stationary means being provided with a stationary surface in rotational abutment with said axial end surface, and said channels terminating at said stationary surface, whereby said channels are adapted to flow-communicate with corresponding conduits during at least a part of each cycle of rotation of said rotatable member.

15. Apparatus according to claim 14, wherein said central portion is connected to said cells by an intermediate flange positioned radially therebetween.

16. Apparatus according to claim 1, wherein said rotatable member is mounted for rotation on a horizontal axis.

17. Process for the treatment of gases with adsorptive materials capable of retaining substituents present in the gases, which comprises passing such gas through an ordinal series of at least two individual directly flow-connected separate gas enclosing zones including a first and a last zone containing adsorptive material impregnated with a liquid having selective solvent capacity for the substituents to be removed from the gas, to effect contact between said gas and said adsorptive material in said zones and to adsorb said substituents along the extent of said ordinal series of zones, said zones being part of a plurality of separate zones one adjacent to the next and arranged in an endless cycle closeable flow-connected path, thereafter treating the adsorptive material in said series of zones with an agent which is a solvent for the impregnated liquid and which is capable of removing the particular substituents adsorbed on said material in said zones, and recovering the particular substituents from said agent, said series of zones ordinally changing in increments of one zone in succession so that the last of said series of zones is flow-separated from the remaining zones, and the next zone in succession becomes the new first zone of said series whereby different sets of zones in succession are ordinally treated with said gas, thereafter with said agent, and said substituents are subsequently recovered from said agent.

References Cited by the Examiner

UNITED STATES PATENTS

| | | | |
|---|---|---|---|
| 2,347,829 | 5/44 | Karlsson et al. | 23—288 |
| 2,507,608 | 5/50 | Miller | 55—181 |
| 2,595,627 | 5/52 | Barnebl et al. | 210—142 X |
| 2,877,861 | 3/59 | Miller | 55—60 |
| 2,967,148 | 1/61 | Karnofsky | 210—31 |

FOREIGN PATENTS

| | | |
|---|---|---|
| 1,171,728 | 10/58 | France. |
| 407,179 | 12/24 | Great Britain. |

REUBEN FRIEDMAN, *Primary Examiner.*

HARRY B. THORNTON, HERBERT L. MARTIN, WESLEY S. COLE, WALTER BERLOWITZ, *Examiners.*